United States Patent

Briel et al.

[11] 4,182,355
[45] Jan. 8, 1980

[54] REFLUX VALVE

[76] Inventors: Adriaan Z. A. Briel, 15 Curtis St., Rynfield, Benoni, Transvaal Province; John Charnock, 9 Park La., 34 Park St., Benoni, Transvaal Province, both of South Africa

[21] Appl. No.: 829,871

[22] Filed: Sep. 1, 1977

[51] Int. Cl.² .............................................. F16K 31/12
[52] U.S. Cl. ..................................... 137/496; 137/859
[58] Field of Search ......................... 137/496, 859, 494

[56] References Cited

U.S. PATENT DOCUMENTS

| | | |
|---|---|---|
| 2,462,189 | 2/1949 | Hess ........................................ 137/496 |
| 2,917,070 | 12/1959 | Langdon .............................. 137/496 X |
| 3,782,410 | 1/1974 | Steuby .................................... 137/496 |

FOREIGN PATENT DOCUMENTS

| | | | |
|---|---|---|---|
| 1158464 | 12/1963 | Fed. Rep. of Germany ........... 137/496 |
| 1268227 | 6/1961 | France ..................................... 137/496 |

Primary Examiner—Harold W. Weakley
Attorney, Agent, or Firm—Sughrue, Rothwell, Mion, Zinn and Macpeak

[57] ABSTRACT

A reflux valve comprising a body having a passage communicating between an inlet and an outlet, a movable valve seat and closure member therefor within the body wherein the said valve seat is movable in a substantially axial direction.

8 Claims, 2 Drawing Figures

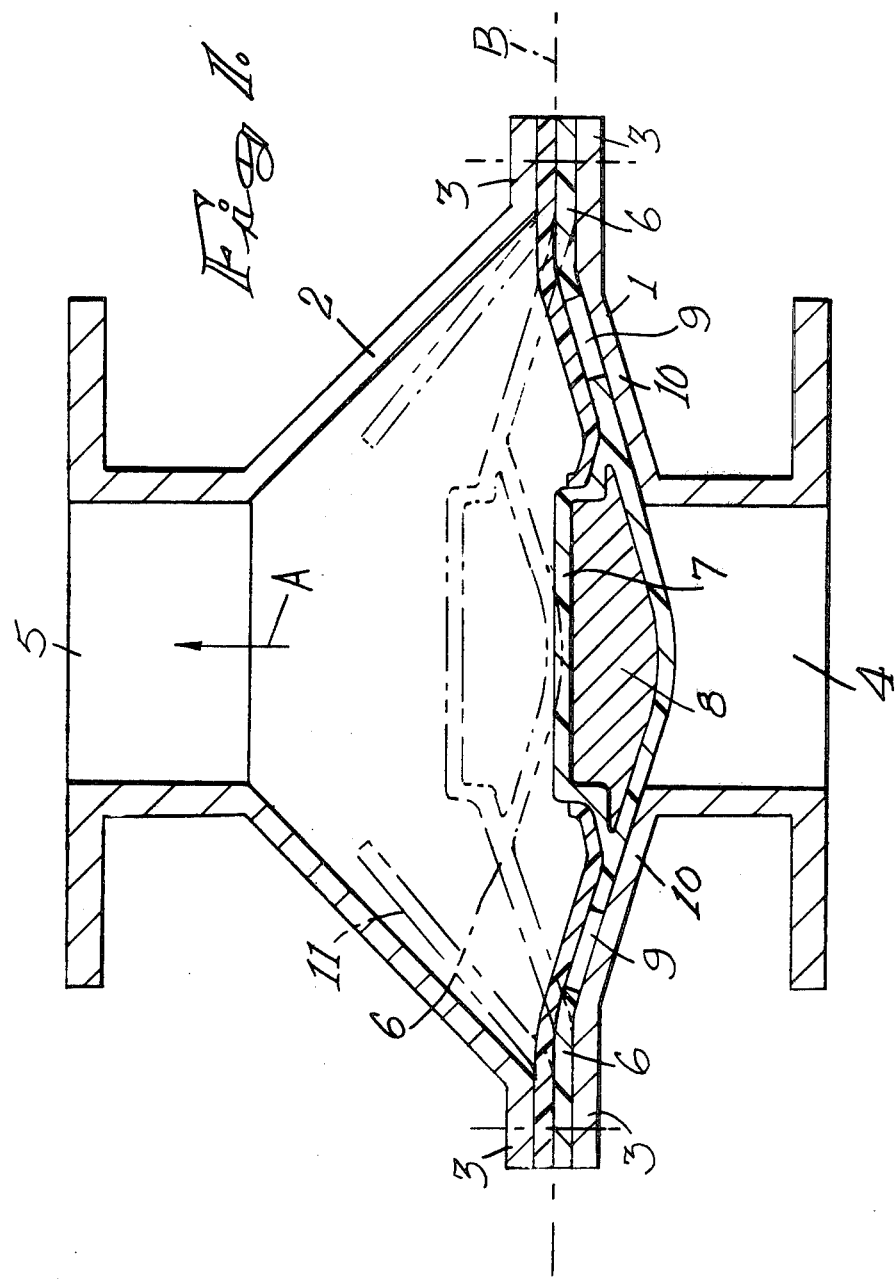

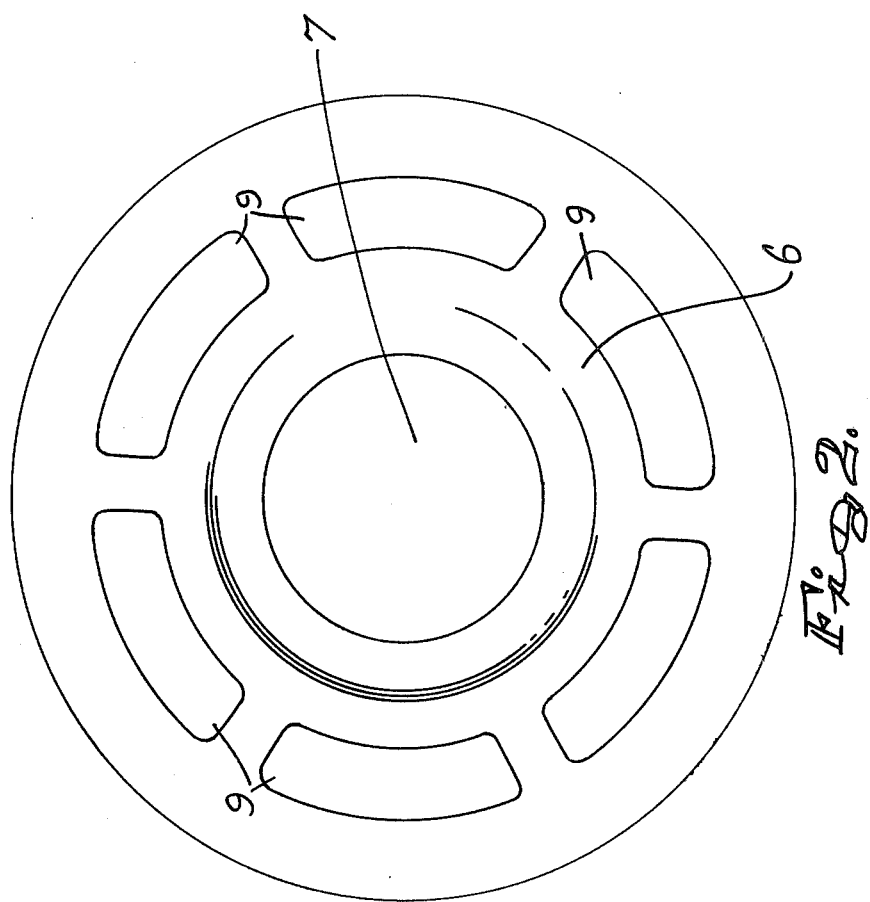

REFLUX VALVE

The present invention relates to reflux or non-return valves.

In presently used reflux valves, a flap or diaphragm is often employed which co-operates with a generally immovable valve seat to close the valve. Where relatively high back-pressures are encountered, closure of the valve can be somewhat violent and noisy as the closure member is sharply forced against the seat.

It is the object of this invention to provide a reflux valve wherein the above problem is at least reduced.

In accordance with this invention a reflux valve is provided comprising a body having a passage communicating between an inlet and an outlet, a valve seat in the passage and a first closure member adapted to co-operate with the seat the reflux valve being characterised in that the valve seat is axially movable in the passage.

Further features of the invention provide for the movable seat to be movable towards a terminal closed position in which the movable valve seat abuts a second and immovable valve seat and in which position the movable valve seat itself serves as a second closure member for the immovable valve seat; for the movable valve seat to be biased in the direction of flow through the valve, for the movable valve seat to comprise a perforated diaphragm which is resiliently deformable transverse to the plane thereof, for the first closure member to comprise at least one flap adapted to close the perforations in the perforated valve seat and for the movable valve seat diaphragm to be provided with a central plug adapted to abut and seal the opening in the second valve seat.

Whilst it is preferred that the movable valve seat is biased somewhat towards the direction of flow through the valve that is not a prerequisite of the invention and thus the movable valve seat may have a natural closed position if required.

In a preferred construction the movable valve seat is made of elastomeric material such as rubber and a central rigid plug is embodied in the central region thereof to co-operate with the immovable valve seat which is simply circular in shape. The plug may be of conical shape to co-operate with the circular immovable seat but it may also be spherical, hemi-spherical or flat as may be required. The plug may be totally enclosed in elastomeric material or it may be mechanically or adhesively secured thereto.

In order to achieve a favourable flow pattern through the valve it is preferred to make the valve body in two co-axial parts connected together by any suitable connecting means. The inlet part in such a case comprises a tubular inlet opening into the apex region of a truncated conical body portion of large cone angle. The outlet body portion is similarly arranged but has a somewhat smaller cone angle to its conical body portion. In order to minimise flow resistance the cross-sectional area for flow through the movable valve seat may be greater than, and is preferably about twice the cross-sectional area of the inlet and outlet connections.

An embodiment of the invention is now described by way of example, with reference to the accompanying drawings in which:

FIG. 1 is a cross-sectional elevation of a reflux valve in accordance with this invention, and, FIG. 2 is a plan of a movable valve seat diaphragm included in the valve.

In this embodiment, a reflux valve comprises a hollow body formed by two parts 1 and 2 which have annular flanges 3 for securing the parts together in any suitable manner. The body has a tubular inlet 4 and a co-axial tubular outlet 5 and flow of liquid between the inlet and outlet only in the direction indicated by arrow 'A' is allowed.

In each case the tubular inlet or outlet opens into the apex region of a truncated conical body portion and it is these body portions that carry the flanges 3. The cone angle in the case of the inlet portion is large (say about 146°) whilst in the case of the outlet portion it is somewhat smaller (say about 90°).

A diaphragm 6 defining a movable valve seat is located in the body and is secured in position by its periphery which is clamped between the flanges 3. The diaphragm has a central plug 7 which in this case, has a central metal plug 8, and a series of curved apertures 9 are provided through the diaphragm surrounding the plug. Preferably the plug is enclosed in the material from which the diaphragm is made. The diaphragm is of a fairly stiff resilient plastics or elastomeric material and is located in the body so that, under normal atmospheric pressure conditions it is in a central rest position in a flat plane indicated by letter 'B' including the flanges 3. However as indicated above any other desired rest position may be chosen. The diaphragm can move away from this rest position in both axial directions and, when it moves towards the inlet 4 it abuts and seals against an immovable valve seat 10 formed by the body wall. In this latter closed terminal position, the apertures 9 are closed and the plug seats and seals against the periphery of the tubular inlet opening.

The diaphragm 6 itself serves as a valve seat for a flap or diaphragm 11 which is also secured in position by being clamped between the body flanges 3. The flap is flexible and is located substantially co-planar with but on the outlet side of the diaphragm 6. The flap has a central opening therein and is not secured to the diaphragm 6 or its plug 7 in this central region.

In use, when liquid flows from inlet to outlet through the valve in the direction indicated by arrow 'A' the diaphragm 6 and flap 11 are distended from the central rest position in the direction of arrow 'A' as shown in ghosted lines in FIG. 1. In this configuration, the flap is moved free of the diaphragm apertures 9 and liquid can flow freely through the valve. The combined areas of the apertures 9 are at least equal the cross-sectional area of the valve inlet 4 so that little obstruction to liquid flow is presented but as stated above they are preferably about twice such inlet area.

When the pressure on the outlet side exceeds that at the inlet, the flap 11 is urged back towards the diaphragm 6 to close the apertures 9. At the same time and thereafter, the diaphragm moves towards the closed terminal position until a complete seal is obtained.

It is to be appreciated that the diaphragm 6 serves both as a valve seat for the flap 11 as well as a closure member for the seat 10. Closure of the valve is not violent because of the resilient and movable nature of the diaphragm 6 and "slapping" is at least reduced.

Other embodiments of the invention are possible within its scope and, in particular the flap 11 could be replaced by other types of closure members and the diaphragm could be dispensed with and another axially movable valve seat used which may or may not be biased in the direction of flow through the valve. Furthermore, in the embodiment described, the plug 7 need not have a metal core 8 but could be hollow and the diaphragm could be provided with suitable reinforcing strips. Also, the conical portion of the body on the inlet side of the diaphragm could, particularly in the case of low pressure applications, be flat which would have the effect of decreasing the cost of the valve.

In some cases, particularly where large diameter valves are concerned, it may well be advantageous to form the immovable valve seat as a rigid grid so that a less robust plug or the like need be used. In such a case the grid will, of course, provide a somewhat restricted flow path and in order to compensate for this the overall outer diameter of the grid could be greater than the internal pipe diameter by a selected amount. Also where such a grid is provided it can conveniently have one or more guide holes therethrough which slidably receives one or more axially movable rods attached to the plug. The guide holes may have anti-friction sleeves fitted therein and the rods may carry optionally adjustable stops thereon which co-operate with the grid to limit movement of the plug off the grid.

What we claim as new and desire to secure by Letters Patent is:

1. A reflux valve comprising a body having a passage communicating between an inlet and an outlet to the body, a movable valve seat in the passage wherein the valve seat has the form of a resiliently deformable diaphragm having an edge mounted to the body and having at least one perforation therethrough defining a flow path through the diaphragm, from the inlet to the outlet and wherein said perforation is offset from the centre of the diaphragm so as to provide a closed central area to said diaphragm to form a flow-blocking portion in co-action with said body, first closure means in the form of a flexible edge-mounted annular flap means positioned adjacent to and on the outlet side to co-operate with the diaphragm to define with the perforations through the diaphragm a non-return valve arrangement therewith the diaphragm and flap means being movable to a limited extent in the passageway against the bias of the inherent resilience of the diaphragm.

2. A reflux valve as claimed in claim 1 in which the movable valve seat is movable towards a terminal closed position in which it abuts a second and immovable valve seat in which position a portion of said movable valve seat forms a closure for the immovable valve seat.

3. A reflux valve as claimed in claim 2 in which the diaphragm has a series of perforations located around a central region thereof which acts as a closure for the immovable valve seat.

4. A reflux valve as claimed in claim 1 in which the resiliently deformable diaphragm has its outer periphery anchored relative to the body.

5. A reflux valve as claimed in claim 4 in which the periphery of the diaphragm is clamped between flanges on two parts of the valve body.

6. A reflux valve as claimed in claim 5 in which the flap means are also clamped between said flanges.

7. A reflux valve as claimed in claim 3 in which the central region of the diaphragm is provided with a rigid plug for co-operation with a second and immovable valve seat provided in the body.

8. A reflux valve as claimed in claim 1 in which the body is defined by two parts of substantially truncated conical shape with the inlet and outlet connections communicating with the apex regions of such conical portions.

* * * * *